C. W. DAVIS.
SIGNAL LAMP CONTROL FOR VEHICLES.
APPLICATION FILED MAR. 28, 1914.

1,165,853.

Patented Dec. 28, 1915.
2 SHEETS—SHEET 1.

Witnesses
J. W. Michael, Jr.
L. P. Chamberlain

Inventor
Cortland W Davis

By Edson Bro's
Attorneys

C. W. DAVIS.
SIGNAL LAMP CONTROL FOR VEHICLES.
APPLICATION FILED MAR. 28, 1914.

1,165,853.

Patented Dec. 28, 1915.
2 SHEETS—SHEET 2.

Witnesses
J. W. Michael, Jr.
L. P. Chamberlain

Inventor
Cortland W. Davis
By
Edson Bro's
Attorneys

UNITED STATES PATENT OFFICE.

CORTLAND W. DAVIS, OF CHICAGO, ILLINOIS.

SIGNAL-LAMP CONTROL FOR VEHICLES.

1,165,853.  Specification of Letters Patent.  Patented Dec. 28, 1915.

Application filed March 28, 1914. Serial No. 827,899.

*To all whom it may concern:*

Be it known that I, CORTLAND W. DAVIS, a citizen of the United States, residing at Chicago, in the county of Cook and State of Illinois, have invented certain new and useful Improvements in Signal-Lamp Controls for Vehicles; and I do hereby declare the following to be a full, clear, and exact description of the invention, such as will enable others skilled in the art to which it appertains to make and use the same.

This invention is an electro-mechanical control for a vehicle lighting circuit.

It is well known to those who have to do with the enforcing of the regulations regarding traffic, and the exhibition of a rear or tail light between sunset and sunrise, that motorists and drivers of vehicles often extinguish their rear light in order to escape pursuit and a possible arrest after violations of an ordinance or an accident.

This invention contemplates the use of electric circuits so arranged that after a rear lamp has once been lighted it will be impossible for the driver to extinguish it, without stopping and dismounting from the vehicle.

With this invention the lamp may be lighted by a person within the vehicle, and in order to insure that it is lighted, a visible signal, such as a pilot lamp, is positioned where it may be viewed by the driver. This visible signal will disclose whether or not the circuit is intact, for if the filament of the main lamp be broken, thereby opening the circuit, then the pilot lamp will not light.

This invention aims to provide a circuit having an electro-magnetic element which is operable by the driver, in any convenient manner, when seated within the vehicle, to control a second circuit. This second electrical circuit is provided with lighting elements, which when closed by means of the first circuit, will automatically light such elements, the opening of the circuit being limited to manually operated means, that are not accessible to a person within the vehicle.

A practical form of the invention is shown in the accompanying drawings, in which—

Figure 1:
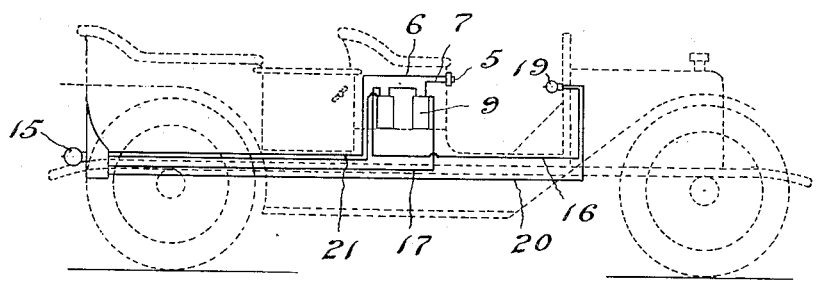
Figure 4:
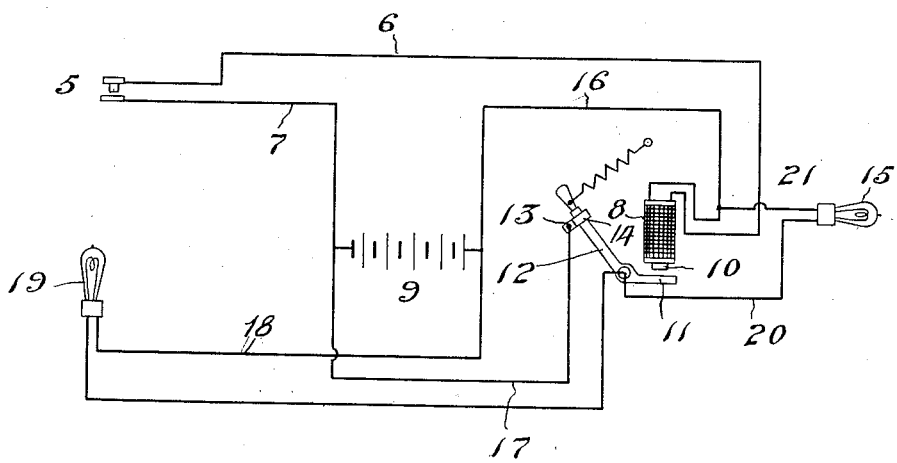
Figure 2:
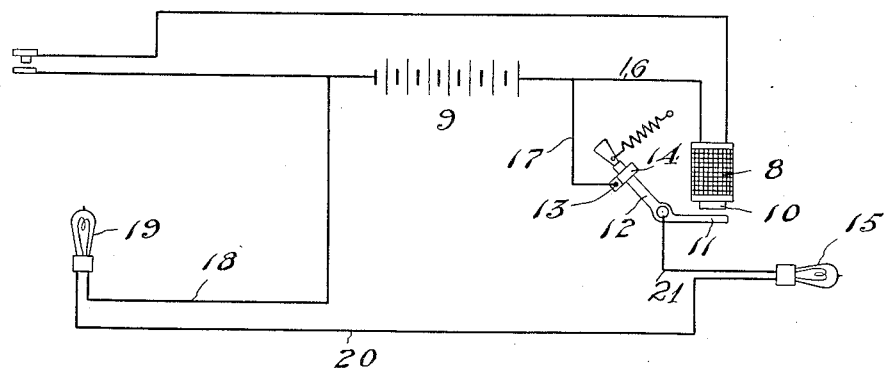
Figure 3:
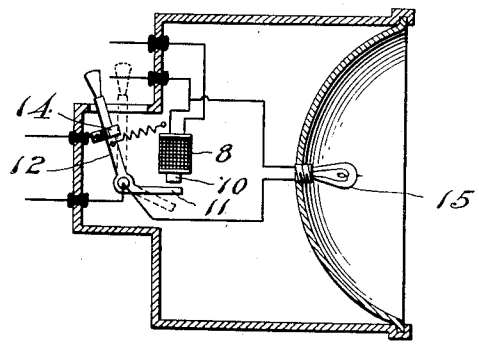
Figure 5:
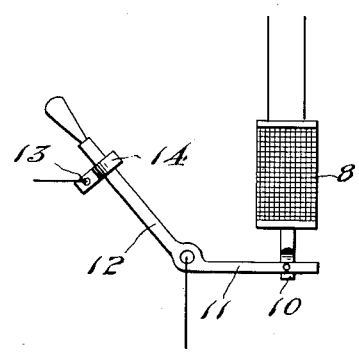

Figure 1 is a side elevation partly in section, showing the circuits in position on a self-propelled vehicle. Fig. 2 is a diagrammatic view of the circuits, having lamps in series. Fig. 3 is an enlarged view of the electro-mechanical closing mechanism. Fig. 4 is a diagrammatic view of the circuits having lamps in parallel. Fig. 5 is a diagrammatic view of a solenoid having a movable coil.

By having the first circuit operable from the seat of the vehicle, it places the push-button or other circuit closing switch 5, in a convenient position for operation by the driver, as for example, upon the dashboard. From this switch 5, are run the conductors 6 and 7, which connect an electro-magnetic coil 8 to a suitable source of energy, such as battery 9. This gives, in effect, an open circuit, as no current flows until the switch 5 is operated. The electro-magnet may be formed and wound in the customary manner, though it may be preferable to use it as a solenoid, having a movable core, as shown in Fig. 5. When used as an electro-magnet, the core 10, projects at one end from the coil so as to be in a position to attract the armature or keeper 11, which is secured to the movable arm 12. This member 11, 12, which is shown as being substantially L-shaped, is provided with a current carrying contact or contacts, as the case may be, 13. This contact is adapted to engage with the clips or contacts 14, that are preferably stationary. The arm 12 is usually made of metal, to which there may be attached a handle or other means for manually operating, as the electro-magnet and the movable member are to be placed in a position that will be inaccessible to a person within or on the vehicle, thereby preventing a person from extinguishing the light emitting element 15, which is placed at the rear of the vehicle, while within the vehicle. At a convenient point on the line 16, which connects one terminal of the electro-magnet coil with the battery 9, there may be tapped the line 17 to connect with the contacts 14.

The line 18 which is shown in Fig. 2, connected with the battery 9, also passes to the pilot lamp 19, that is placed in such a position as to be visible to the driver, who may be able to observe its light unconsciously and without effort, to that end. It is thought preferable to have it mounted upon the dashboard. From the pilot lamp there runs a line 20 which connects with the main or rear lamp 15. To the other terminal of the lamp 15 there is connected a line 21, to connect the lamp 15 with the contact 13.

In Fig. 4, which is the preferred embodiment of the invention, the lamps 15 and 19 are arranged upon the loop system of wiring. From the push-button or switch 5, runs the conductor or line 6 to the electro-magnetic coil, the other terminal of the coil connecting with the battery 9, by means of the line 16. At a convenient point on the line 16, there is tapped onto it the line 21 which connects with one terminal of the lamp 15. From the other lamp terminal the line 20 connects with the pilot lamp 19, and at some selected point on the line 20 it is connected with the movable member 12 in any usual manner. The other terminal of the pilot lamp is shown connected to the battery 9, with the line 18 at the point of origin of the line 16. This portion constitutes the loop, and may be followed from the battery 9, line 16, to line 21, to the lamp 15, to line 20, to the lamp 19, returned to the battery by way of the line 18, thus the current is of the same polarity in all portions of the loop. Starting again from the push button or switch 5, the line 7 is connected to battery 9, and connected at this point begins the line 17 which runs to the contacts 14. When the member 12 is moved by means of the electromagnet 8 attracting the armature or keeper 11, through circuit closer 5, the contact 13 is brought into engagement with the contacts 14 where it is retained against further movement, until it is opened manually. The circuit comprising contact 5, conductor 6, electro-magnet 8, conductor 16, battery 9 and conductor 7, after the current once flows through, remains inoperative so far as the reopening of the second circuit is concerned, and cannot be made to close the second or loop circuit again until the loop circuit is opened by the manually operated means.

Assuming the vehicle to be operated at dusk and it is desired to light the rear or tail light, which is required to be carried by nearly all municipalities, the switch or push button 5 is pressed or closed which permits the current to flow in conductor 6 to the coil or magnet 8, thence to the other side of the battery 9, and from said other side of the battery to the switch 5. This operation closes the circuit, and makes it for the time being a closed circuit, or until circuit closer 5 is reopened.

After the closure of the above named circuit, the coil 8 attracts the armature 11 and the movable member 12, which causes the contact 13 to engage with the contact 14, and to be frictionally held against displacement by the movement of the vehicle. To disengage it, manually operated means must be employed, and the person so operating it must be exterior of the vehicle.

In the embodiment of Fig. 2, when the contacts are in engagement, the current is permitted to flow from the battery 9 through conductors 16 and 17, then through the contacts 13 and 14, through the line 21 to the lamp or other light emitting means 15. From the other side of the lamp runs the conductor 20 which connects with the pilot lamp 19, and from this lamp conductor 18 leads to the battery 9. This establishes the circuit in a closed relation which permits the current to flow and light both lamps. If, for any reason, the circuit is incomplete, the pilot lamp will not glow, as for instance the lamp 15 may have its filament broken, or the circuit leading thereto, or from either side of the source of energy, is interrupted.

It is to be understood that minor changes in form and details of construction may be resorted to, without departing from the spirit of the invention, or the scope of the appended claims.

Having thus described my invention, what I claim is:—

1. In a signal lamp control for vehicles, a vehicle having a rear signal lamp, a pilot lamp positioned at a point on said vehicle to be visible continuously to the driver, a plurality of circuits, a plurality of closing means therefor, one of said closing means operating to close the circuits to the lamps, and after having been closed by another of said closing means, the latter closing means remains inoperative to again close the same, until the first closing means is manually operated.

2. In a signal lamp control for vehicles, the combination with a vehicle and a source of energy, of a plurality of circuits, a plurality of coöperating closing means therefor, one of said closing means being positioned at a point inaccessible to an occupant within said vehicle, and after having been closed by another of said closing means, the latter closing means thereafter remains inoperative relative to the inaccessible means, said inaccessible closing means being adapted to open its circuit by manually operated means.

3. In a signal lamp control for vehicles, the combination with a vehicle and a source of electric energy, a plurality of circuits, one of said circuits containing an electromagnet, a movable member pivotally mounted adjacent thereto and adapted to be acted upon by said electromagnet, current carrying contact fingers adapted to frictionally engage with a portion of said member, a plurality of lamps in said circuit, one of said lamps being positioned at the rear of the vehicle, said lamps adapted to be lighted simultaneously by the movement of said member, another of said circuits provided with a closing means to connect said source of energy with said electromagnet to energize the same, said closing means thereafter remaining inoperative while said electromagnet circuit is closed.

4. In a signal lamp control for vehicles, a plurality of circuits, a lamp in one of said circuits, an electromagnet in another of said circuits, a plurality of resilient current carrying fingers, a movable member mounted adjacent to said electromagnet, said movable member being provided at one end with an armature, and near the other end with a current carrying blade adapted to frictionally engage with said fingers, resilient means connected to said movable member to retain said member thereby preventing the accidental closing of the circuit, and closing means in the electromagnet circuit to permit of the intermittent use of the energy in said circuit to attract said armature.

In testimony whereof I affix my signature in presence of two witnesses.

CORTLAND W. DAVIS.

Witnesses:
 A. L. ALLEXON,
 FRED'K SHEPPY.